(12) United States Patent
Shimizu (10) Patent No.: US 8,231,813 B2
(45) Date of Patent: Jul. 31, 2012

(54) MANUFACTURING METHOD OF OPTICAL WAVEGUIDE FOR TOUCH PANEL

(75) Inventor: Yusuke Shimizu, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/367,031

(22) Filed: Feb. 6, 2009

(65) Prior Publication Data

US 2009/0202737 A1      Aug. 13, 2009

Related U.S. Application Data

(60) Provisional application No. 61/042,094, filed on Apr. 3, 2008.

(30) Foreign Application Priority Data

Feb. 7, 2008    (JP) .................................. 2008-027975

(51) Int. Cl.
   *B05D 3/06*    (2006.01)
(52) U.S. Cl. ...................... 264/1.24; 264/1.27; 264/496
(58) Field of Classification Search ................. 264/1.28, 264/1.24, 1.38, 496, 1.27
   See application file for complete search history.

(56) References Cited

U.S. PATENT DOCUMENTS

| | | | | |
|---|---|---|---|---|
| 5,850,498 | A * | 12/1998 | Shacklette et al. ............ | 385/129 |
| 2002/0018634 | A1* | 2/2002 | Korenaga et al. ............. | 385/132 |
| 2002/0051614 | A1* | 5/2002 | Teramoto et al. ............. | 385/129 |
| 2004/0021237 | A1* | 2/2004 | Shimizu et al. ............... | 264/1.28 |
| 2004/0178523 | A1* | 9/2004 | Kim et al. .................... | 264/1.27 |
| 2005/0207723 | A1 | 9/2005 | Hayashi et al. | |
| 2005/0271319 | A1 | 12/2005 | Graham | |
| 2006/0188196 | A1* | 8/2006 | Charters et al. ................ | 385/33 |
| 2006/0290017 | A1* | 12/2006 | Yanagisawa .................. | 264/1.27 |
| 2007/0104440 | A1* | 5/2007 | Kim et al. ..................... | 385/129 |
| 2007/0114684 | A1 | 5/2007 | Ohtsu et al. | |
| 2007/0148482 | A1* | 6/2007 | Fujinaka et al. ........... | 428/474.4 |
| 2007/0154133 | A1 | 7/2007 | Graham | |

(Continued)

FOREIGN PATENT DOCUMENTS

CN         1973224 A     5/2007

(Continued)

OTHER PUBLICATIONS

European Search Report dated Jun. 17, 2009, issued in corresponding European Patent Application No. 09152279.7.

(Continued)

*Primary Examiner* — Joseph Del Sole
*Assistant Examiner* — Kimberly A Stewart
(74) *Attorney, Agent, or Firm* — Westerman, Hattori, Daniels & Adrian, LLP (57) ABSTRACT

A touch panel optical waveguide production method that ensures improved productivity while suppressing occurrence of voids. For formation of an over-cladding layer, a coating layer (4a) of an uncured or half-cured photopolymerizable resin composition as an over-cladding layer material is formed over a surface of an under-cladding layer (2) formed with cores (3). In turn, a molding die (6) composed of a light-transmissive material is pressed against the coating layer (4a) with a predetermined die surface of the molding die (6) being properly positioned with respect to the coating layer (4a), and then the coating layer (4a) is exposed to light through the molding die (6). After the exposure, the molding die is removed. Thus, the over-cladding layer is formed, in which the cores (3) are buried.

3 Claims, 5 Drawing Sheets

U.S. PATENT DOCUMENTS

| | | | |
|---|---|---|---|
| 2007/0189690 A1 | 8/2007 | Hayashi et al. | |
| 2007/0237454 A1* | 10/2007 | Fujii et al. | 385/33 |
| 2008/0193094 A1 | 8/2008 | Enami et al. | |
| 2008/0277809 A1* | 11/2008 | Shimizu | 264/1.24 |

FOREIGN PATENT DOCUMENTS

| | | | |
|---|---|---|---|
| JP | H09-022329 | * | 1/1997 |
| JP | 2001-272565 A | | 10/2001 |
| JP | 2005-165138 | * | 6/2005 |
| JP | 2005-165138 A | | 6/2005 |
| JP | 2005-266254 A | | 9/2005 |
| JP | 2006-007527 | * | 1/2006 |

OTHER PUBLICATIONS

Chinese Office Action dated Nov. 24, 2011, issued in corresponding Chinese Patent Application No. 200910134641.5.

Japanese Office Action dated Jan. 5, 2012, issued in corresponding Japanese Patent Application No. 2008-027975.

* cited by examiner

PRIOR ART

Fig. 9 (b)

PRIOR ART

Fig. 10 (a)

PRIOR ART

Fig. 10 (b)

PRIOR ART

Fig. 10 (c)

PRIOR ART

MANUFACTURING METHOD OF OPTICAL WAVEGUIDE FOR TOUCH PANEL

RELATED APPLICATIONS

This application claims the benefit of U.S. Provisional Application No. 61/042,094, filed Apr. 3, 2008, which is hereby incorporated by reference.

BACKGROUND OF THE INVENTION

1. Field of the Invention

The present invention relates to a manufacturing method of an optical waveguide for a touch panel.

2. Description of the Related Art

Optical waveguides, which are typically incorporated in optical waveguide devices, optical integrated circuits, optical wiring boards and the like, are widely used in the fields of optical communications, optical information processing and other general optics. Lately, the optical waveguides are produced by using a photosensitive resin such as a UV-curable resin. For example, an under-cladding layer is formed on a substrate, and then a photosensitive resin layer is formed on the under-cladding layer. In turn, the resulting photosensitive resin layer is exposed to light via a photo mask having a predetermined pattern, and developed by removing an unexposed portion of the photosensitive resin layer, whereby cores are formed having the predetermined pattern. Then, an over-cladding layer is formed over the cores. Thus, an optical waveguide is produced (see, for example, JP-A-2005-165138).

In the optical waveguide production method disclosed in JP-A-2005-165138, a material applying step, an exposing step, a developing step and a drying step are performed for the formation of each of the cladding layers (the under-cladding layer and the over-cladding layer) and the cores. However, where a process sequence including the applying step, the developing step, the exposing step and the drying step is performed for the formation of each of the under-cladding layer, the over-cladding layer and the cores, the number of process steps is increased, thereby increasing production costs. Particularly, the exposing step and the developing step each include many sub-steps, requiring improvement.

Figure 9:
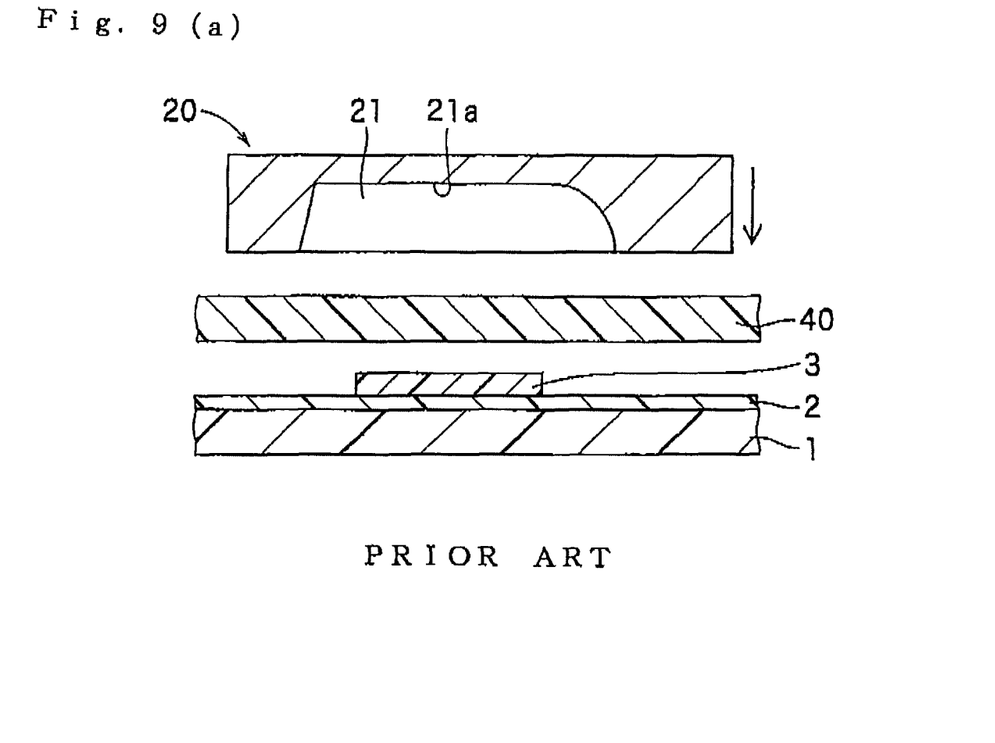
FIGS. 9(a) and 9(b) are explanatory diagrams schematically showing a prior-art optical waveguide production method.

A conceivable method for reduction in the number of process steps is, for example, to employ a die-forming method for the formation of the over-cladding layer. As shown in FIG. 9(a), an under-cladding layer 2 and cores 3 are first formed in this order on a substrate 1. Then, a molding die 20 formed with a recess 21 having a die surface 21a conformable to the surface geometry of the over-cladding layer 4 (see FIG. 9(b)) is prepared, and a thermosetting resin sheet 40 is prepared as a material for the over-cladding layer 4. In turn, the thermosetting resin sheet 40 is positioned above the under-cladding layer 2 and the cores 3. Then, as shown in FIG. 9(b), the thermosetting resin sheet 40 is pressed on the under-cladding layer 2 by the molding die 20 and, in this state, heated and cured, whereby the over-cladding layer 4 is formed. Thereafter, the molding die is removed. This method obviates the applying step, the exposing step and the developing step for the formation of the over-cladding layer 4. This reduces the number of process steps and the costs required for the formation of the over-cladding layer 4.

In the method in which the thermosetting resin sheet 40 is pressed by the molding die 20, however, the thermosetting resin sheet 40 is sandwiched between the under-cladding layer 2 and the molding die 20, so that burrs 41 are liable to occur on edges of the formed over-cladding layer 4. This additionally requires the step of removing the burrs 41, so that the reduction in the number of process steps and the costs is unsatisfactory. Where the optical waveguide produced in the aforementioned manner is used for a touch panel, a portion of the over-cladding layer 4 associated with distal ends of the cores 3 has a lens shape (curved surface) 4a as shown in FIG. 9(b). Therefore, the burrs 41 are present on an edge of the lens-shaped portion 4a, and are likely to prevent convergence of light and the like.

Figure 10:
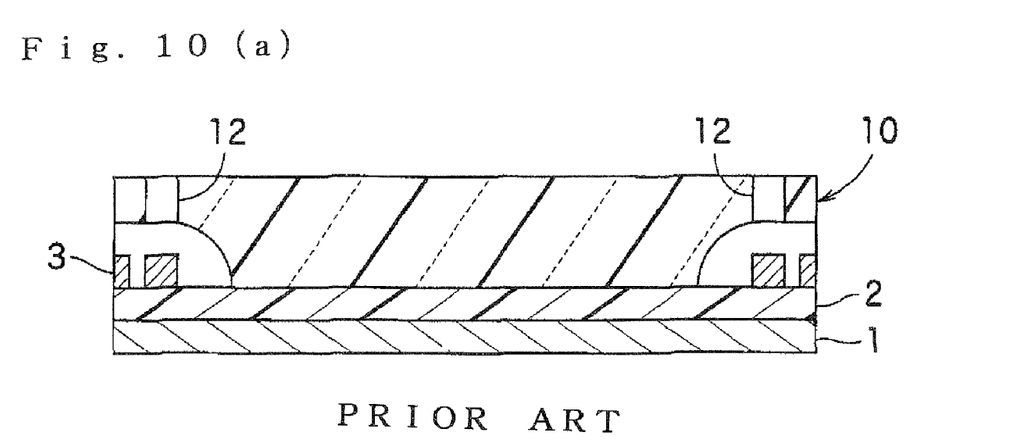
FIGS. 10(a), 10(b) and 10(c) are explanatory diagrams schematically showing another prior-art optical waveguide production method.

To cope with this problem, the applicant of the present invention has proposed the following optical waveguide production method, and filed a patent application (JP-Application-2007-123830) related to this method. In this production method, when an optical waveguide (see FIG. 10(c)) including an under-cladding layer 2, cores 3 of a predetermined pattern and an over-cladding layer 4 is produced on a surface of a substrate 1, a special molding die is used for formation of the over-cladding layer 4. That is, the under-cladding layer 2 and the cores 3 of the predetermined pattern are formed on the surface of the substrate 1 in the same manner as described above by performing the applying step, the exposing step, the developing step and the drying step (see FIG. 10(a)). In turn, as shown in FIG. 10(a), a molding die 10 of a light-transmissive material formed with a recess having a die surface conformable to the surface geometry of the over-cladding layer 4 and through-holes 12 communicating with the recess is prepared, and an opening of the recess of the molding die 10 is brought into intimate contact with a surface of the under-cladding layer 2. In this state, a liquid resin as a material for the over-cladding layer 4 is injected into a cavity defined between the die surface of the recess and the surface of the under-cladding layer 2 through the through-holes 12, and then exposed to radiation such as ultraviolet radiation through the molding die as shown in FIG. 10(b). Thus, the injected material is cured. Then, the molding die 10 is removed. Thus, the over-cladding layer 4 is formed, in which the cores 3 of the predetermined pattern are buried as shown in FIG. 10(c) (see JP-Application-2007-123830).

In the production method disclosed in JP-Application-2007-123830, however, the over-cladding layer material should be injected into the molding die 10 through the through-holes 12, and a certain time period is required for the curing of the material from the injection of the material. Therefore, this method is unsatisfactory in productivity, thereby requiring improvement. When the over-cladding layer material is injected into the cavity through the through-holes 12, air is liable to be trapped in the cavity, resulting in occurrence of voids. Therefore, the optical waveguide, if used for a touch panel, requires improvement in product reliability.

In view of the foregoing, it is an object of the present invention to provide a touch panel optical waveguide production method that ensures improved productivity while suppressing occurrence of voids.

DISCLOSURE OF THE INVENTION

To achieve the aforementioned object, a touch panel optical waveguide production method according to the present invention includes the steps of: forming an under-cladding layer on a surface of a substrate; forming a core of a predetermined pattern on the under-cladding layer; forming a coating layer of an uncured or half-cured photopolymerizable resin composition as an over-cladding layer material over a surface of the under-cladding layer formed with the core; pressing a molding die composed of a light-transmissive material against the coating layer of the over-cladding layer material with a predetermined die surface of the molding die being properly positioned with respect to the coating layer; exposing the coating layer to light through the molding die; and removing the molding die after the exposure, whereby an over-cladding layer is formed in which the core is buried.

The inventor of the present invention conducted intensive studies to provide a touch panel optical waveguide production method which ensures improved productivity while suppressing occurrence of voids. As a result, the inventor found that an over-cladding layer can be formed, after formation of an under-cladding layer and a core of a predetermined pattern on a surface of a substrate, by forming a resin portion of an over-cladding layer material having a viscosity in a specific range over a surface of the under-cladding layer formed with the core, pressing a molding die composed of a light-transmissive material against the resin portion from the above, exposing the resin portion to light in the pressed state, and removing the molding die, rather than by filling the resin material in the molding die through the through-holes as in the aforementioned method. The inventor also found that the over-cladding layer thus formed as incorporating the core is substantially free from voids, and this method requires a reduced number of process steps for the production. Thus, the inventor attained the present invention.

According to the present invention, the core of the predetermined pattern is formed on the under-cladding layer formed on the surface of the substrate. In turn, the coating layer of the uncured or half-cured photopolymerizable resin composition as the over-cladding layer material is formed over the surface of the under-cladding layer formed with the core, and then the molding die composed of the light-transmissive material is pressed against the coating layer of the over-cladding layer material with the predetermined die surface thereof being properly positioned with respect to the coating layer. Subsequently, the coating layer is exposed to light through the molding die, and the molding die is removed. Thus, the over-cladding layer is formed, in which the core is buried. In this manner, the touch panel optical waveguide is produced. Therefore, the occurrence of the voids is suppressed in the formation of the over-cladding layer. Since the formation of the over-cladding layer is achieved by the die-forming, the number of process steps is reduced without the need for the post-exposure developing step as compared with the prior-art over-cladding layer forming step. Thus, the touch panel optical waveguide can be efficiently produced as having higher reliability at lower production costs.

In the step of forming the coating layer of the uncured or half-cured photopolymerizable resin composition as the over-cladding layer material over the surface of the under-cladding layer formed with the core, the coating layer of the uncured or half-cured photopolymerizable resin composition as the over-cladding layer material may be formed over the surface of the under-cladding layer formed with the core so that the core is buried in the coating layer. In the step of pressing the molding die against the coating layer with the predetermined die surface of the molding die being properly positioned, the molding die may be entirely heated to 120 to 180° C. for heat press. In this case, the photopolymerizable resin composition has a longer working life, so that the touch panel optical waveguide having higher reliability can be further efficiently produced at lower production costs as compared with the process employing the thermosetting resin sheet.

In the step of forming the coating layer of the uncured or half-cured photopolymerizable resin composition as the over-cladding layer material over the surface of the under-cladding layer formed with the core, the coating layer may be formed by applying the uncured photopolymerizable resin composition as the over-cladding layer material dropwise on a portion of the surface of the under-cladding layer uncovered with the core. In the step of pressing the molding die against the coating layer with the predetermined die surface of the molding die being properly positioned, the molding die may be entirely kept at 20 to 80° C. for press. In this case, the pressing step is performed at a lower temperature, so that the formed product has little dimensional variations. Therefore, the touch panel optical waveguide having higher reliability can be further efficiently produced at lower production costs.

DETAILED DESCRIPTION

Embodiments of the present invention will hereinafter be described in detail with reference to the drawings.

First, a touch panel optical waveguide production method according to the present invention will be briefly described. According to the present invention, a touch panel optical waveguide is produced, for example, in the following manner. As in the prior art, an under-cladding layer material is applied onto a surface of a substrate, and irradiated with light such as ultraviolet radiation to be thereby cured. Thus, an under-cladding layer is formed. In turn, a core material is applied onto the under-cladding layer to form a core layer, and then exposed to light such as ultraviolet radiation via a photo mask of a predetermined pattern to be thereby cured in the predetermined pattern. After the core layer is exposed in the predetermined pattern, a development process is performed by dissolving an unexposed portion of the core layer with the use of a developing agent. Thus, cores of the predetermined pattern are formed. In this manner, the under-cladding layer and the cores of the predetermined pattern are formed on the surface of the substrate in the same manner as in the prior-art production method. In the present invention, a coating layer of an uncured or half-cured photopolymerizable resin composition as an over-cladding layer material is formed over a surface of the under-cladding layer formed with the cores, and then a molding die composed of a light-transmissive material is pressed against the coating layer with a predetermined die surface thereof being properly positioned with respect to the coating layer. After the coating layer is exposed to light through the molding die, the molding die is removed. Thus, an over-cladding layer is formed in which the cores are buried. In this manner, the touch panel optical waveguide is produced. One feature of the present invention resides in the method of forming the over-cladding layer without injecting the material into the cavity through the through-holes of the molding die as in the prior-art method.

The inventive touch panel optical waveguide production method is categorized into two different methods according to the type of the over-cladding layer material to be used and the method of forming the coating layer by using the over-cladding layer material.

Of the two methods, a first touch panel optical waveguide production method includes the step of forming the coating layer of the uncured or half-cured photopolymerizable resin composition as the over-cladding layer material over the surface of the under-cladding layer formed with the cores so that the cores are buried in the over-cladding layer.

With reference to the drawings, the first touch panel optical waveguide production method will be described in detail by way of an embodiment.

First, a substrate 1 (see FIG. 1) is prepared. The substrate 1 is not particularly limited, but exemplary materials for the substrate 1 include a resin, glass, quartz, silicon and a metal. Examples of the resin include polyethylene terephthalates, polyethylene naphthalates and polyimides. An example of the metal is stainless steel. The thickness of the substrate 1 is not particularly limited, but is typically in the range of 50 to 200 μm.

Figure 1:
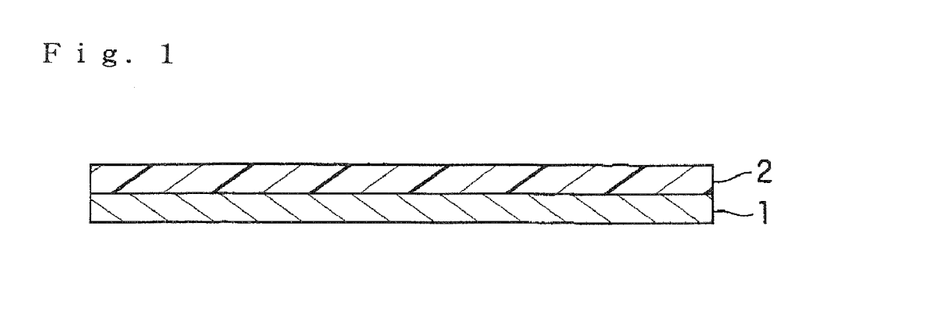
FIG. 1 is an explanatory diagram schematically showing an inventive touch panel optical waveguide production method.

Then, as shown in FIG. 1, an under-cladding layer 2 is formed on a predetermined surface portion of the substrate 1. Exemplary materials for the under-cladding layer 2 include photosensitive epoxy resin compositions and polyimide resin compositions. The formation of the under-cladding layer 2 is achieved in the following manner. A varnish prepared by dissolving any of the aforementioned resin compositions in a solvent is applied onto the substrate 1. The application of the varnish is achieved, for example, by a spin coating method, a dipping method, a casting method, an injection method, an ink jet method, a continuous roll-to-roll coating method using a coater such as a multi-coater, or the like. In turn, the resulting varnish film is cured. Where a photosensitive epoxy resin composition is used as the material for the under-cladding layer 2, the curing is achieved by exposing the varnish film to radiation via a photo mask having an opening pattern conformable to the desired shape of the under-cladding layer 2. An exposed portion of the varnish film later serves as the under-cladding layer 2. Where a polyimide resin composition is used as the material for the under-cladding layer 2, the curing is typically achieved by a heat treatment at 300 to 400° C. for 60 to 180 minutes. The under-cladding layer 2 typically has a thickness of 5 to 50 μm. Thus, the under-cladding layer 2 is formed.

Figure 2:
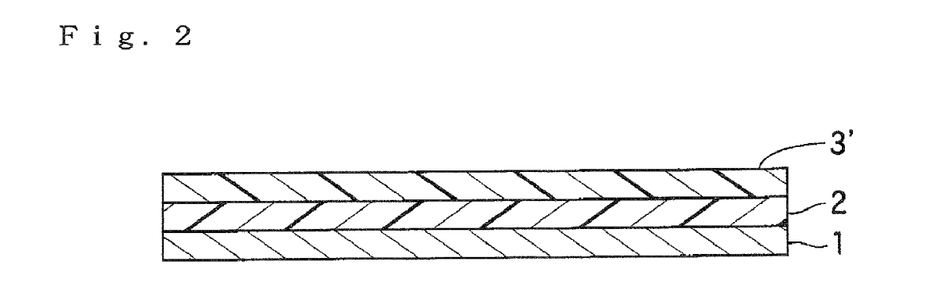
FIG. 2 is an explanatory diagram schematically showing the inventive touch panel optical waveguide production method.

In turn, as shown in FIG. 2, a resin layer 3' of a core material is formed on a surface of the under-cladding layer 2. A photosensitive resin composition is typically used as the core material. The core material has a greater refractive index than the materials for the under-cladding layer 2 and an over-cladding layer 4 (see FIG. 6) to be described later. The refractive index may be adjusted, for example, by selection of the types of the materials for the under-cladding layer 2, the cores 3 and the over-cladding layer 4 and adjustment of the composition ratio thereof. The formation of the cores 3 is achieved in the following manner. As in the formation of the under-cladding layer 2, a varnish prepared by dissolving the photosensitive resin composition in a solvent is applied onto the under-cladding layer 2. The application of the varnish is achieved, for example, by a spin coating method, a dipping method, a casting method, an injection method, an ink jet method, a continuous roll-to-roll coating method using a coater such as a multi-coater, or the like. In turn, the resulting varnish film is dried to provide the resin layer 3'. The drying is typically achieved by a heat treatment at 50 to 120° C. for 10 to 30 minutes.

Figure 3:
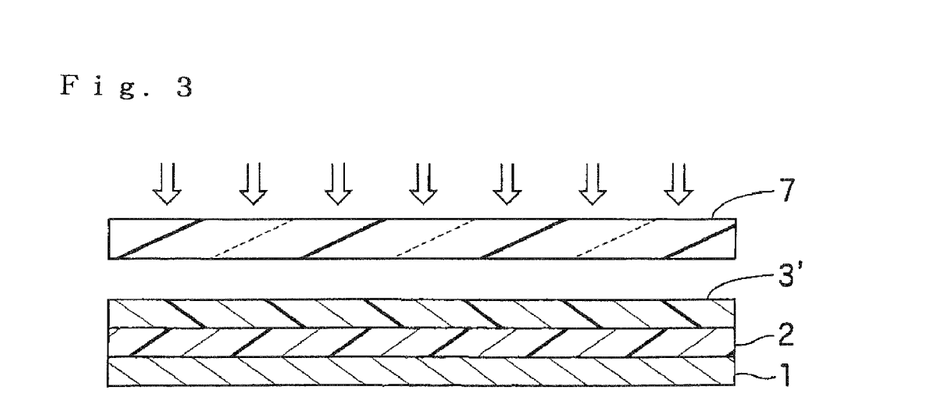
FIG. 3 is an explanatory diagram schematically showing the inventive touch panel optical waveguide production method.

Subsequently, as shown in FIG. 3, the resin layer 3' is exposed to radiation via a photo mask 7 formed with an opening pattern conformable to the predetermined pattern of the cores 3. Exposed portions of the resin layer 3' later serve as the cores 3 (see FIG. 4) after an unexposed portion of the resin layer 3' is dissolved away. More specifically, a method for the exposure is not particularly limited, but a contact exposure method, a proximity exposure method in which the photo mask 7 is slightly spaced from the resin layer 3', or a projection exposure method may be employed. For more accurate exposure, the contact exposure method or the proximity exposure method is preferably employed. A parallel beam provided by using a filter or the like is preferably used for the exposure to the radiation. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm$^2$, preferably 50 to 3000 mJ/cm$^2$.

After the exposure, a heat treatment is performed for completion of a photoreaction. The heat treatment is performed at 80° C. to 250° C., preferably at 100° C. to 200° C., for 10 seconds to two hours, preferably for five minutes to one hour. Thereafter, a development process is performed by dissolving away the unexposed portion of the resin layer 3' by using a developing solution, whereby a remaining portion of the resin layer 3' has a desired core pattern. Exemplary methods for the development process include an immersion method, a spray method and a puddle method. Examples of the developing solution include a γ-butyrolactone aqueous solution, organic alkali aqueous solutions such as of hydroxytetramethylammonium and inorganic alkali aqueous solutions such as of sodium hydroxide and potassium hydroxide. The alkali concentration is typically 2 to 5% by weight. As required, a lower aliphatic alcohol such as methanol, ethanol, n-propanol or isopropanol may be added to the alkali aqueous solution. The developing solution and conditions for the development are properly selected depending on the photosensitive resin composition.

Then, the developing solution in the remaining portions of the resin layer having the core pattern is removed by a heat treatment. The heat treatment is typically performed at 80° C. to 120° C. for 10 to 30 minutes. Thus, the remaining portions of the resin layer having the core pattern serve as the cores 3. The cores 3 typically each have a thickness of 5 to 30 μm, and a width of 5 to 30 μm. The cores 3 preferably each have a lens-shaped end portion for prevention of divergence of a light beam emitted from an end thereof, for convergence of a light beam to be incident on an end thereof, and for improvement of the light transmission efficiency.

Figure 4:
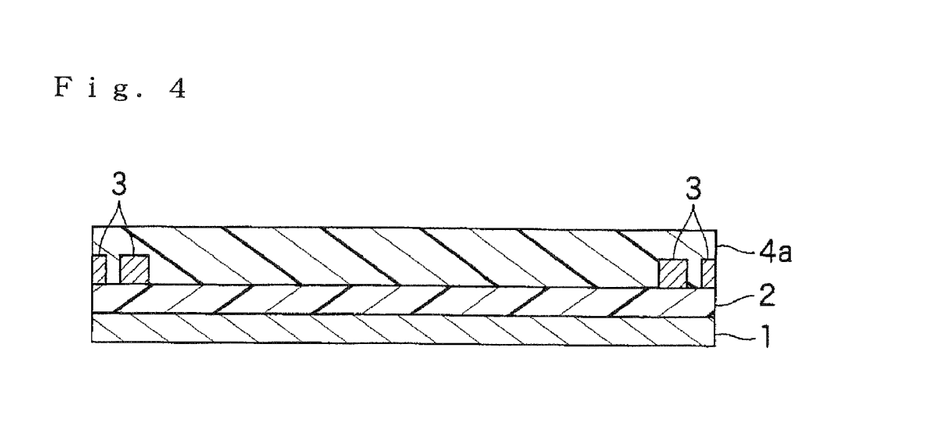
FIG. 4 is an explanatory diagram schematically showing a first touch panel optical waveguide production method according to the present invention.

In the first touch panel optical waveguide production method according to the present invention, the over-cladding layer 4 is formed (press-formed) by performing steps to be described later with reference to FIGS. 4 to 6 after the aforementioned steps. This is a major feature of the present invention. As shown in FIG. 4, a coating layer 4a is formed over the surface of the under-cladding layer 2 formed with the cores 3 of the predetermined pattern by applying a half-cured or uncured photopolymerizable resin composition as a material for the over-cladding layer 4 as covering the cores 3 on the under-cladding layer 2. For the formation of the (half-cured) coating layer 4a, the over-cladding layer material is applied, and then exposed to radiation and heated so as to be half-cured (in a B-stage) as having a desired viscosity. Another exemplary method for the formation of the coating layer 4a is to form an uncured film by preparing a higher viscosity over-cladding layer material from a higher molecular weight epoxy resin, adjusting the viscosity of the over-cladding layer material by addition of a diluent such as an organic solvent, applying the resulting material, and evaporating the solvent by heat-drying. An epoxy resin having a number average molecular weight (Mn) of about 1000 to about 5000 is preferably used as the higher molecular weight epoxy resin. Where the epoxy resin is provided in the form of a 40 wt % butylcarbitol solution thereof, the over-cladding layer material preferably has a viscosity of 300 to 2000 mPa·s after the adjustment. The coating layer 4a thus formed preferably has a thickness of 100 to 500 µm. Where the thickness is in the aforementioned range, it is possible to substantially prevent the coating layer 4a from leaking out of a forming region from the molding die during the press-forming of the coating layer 4a with the use of the molding die as will be described later.

Figure 5:
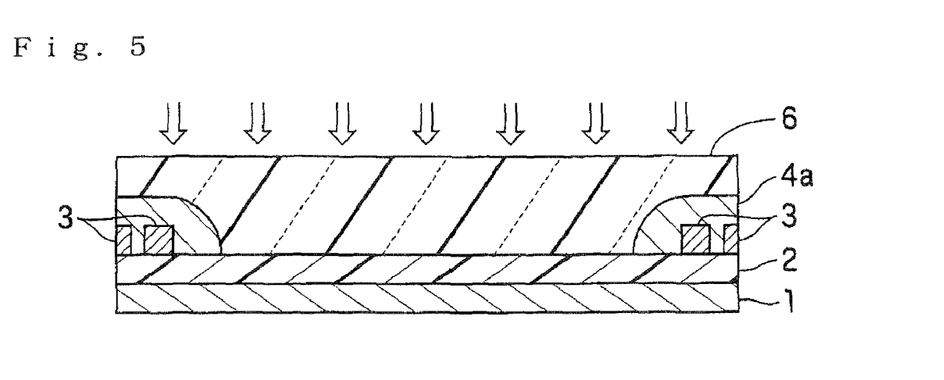
FIG. 5 is an explanatory diagram schematically showing the first touch panel optical waveguide production method according to the present invention.

In turn, as shown in FIG. 5, a molding die 6 composed of a light-transmissive material such as quartz glass is pressed against the half-cured or uncured coating layer 4a from the above with a die surface thereof being properly positioned with respect to the coating layer 4a, and heated. In this state, the coating layer 4a is exposed to radiation through the molding die 6. The coating layer 4a is completely cured by heating after the exposure to the radiation. Thus, the over-cladding layer 4 is formed. Then, as shown in FIG. 6, the molding die 6 is removed. The over-cladding layer 4 thus formed includes curved surfaces (lens-shaped surfaces) 8 each having a desired surface geometry as covering the distal ends of the cores 3 buried therein. The over-cladding layer 4 typically has a thickness of 50 to 2000 µm.

In the first touch panel optical waveguide production method according to this embodiment, the die surface of the molding die 6 is configured such as to have lens-shaped surface portions in association with the distal ends of the cores 3.

The press-forming with the use of the molding die 6 is preferably carried out at a press pressure of 2 to 10 MPa by a vacuum press method (e.g., at $1.33 \times 10^{-2}$ to $1.33 \times 10^{-4}$ kPa). The heating during the press-forming is preferably such that the molding die 6 is entirely heated to 120 to 180° C. For the heating, the resulting product may be heated via the molding die 6 by keeping an upper portion of the molding die 6 in contact with a heating plate, or the resulting product may be held between upper and lower heating plates to be heated from the above and the below. Alternatively, the resulting product may be heated by a heating plate disposed on a lower side of the substrate 1.

Figure 6:
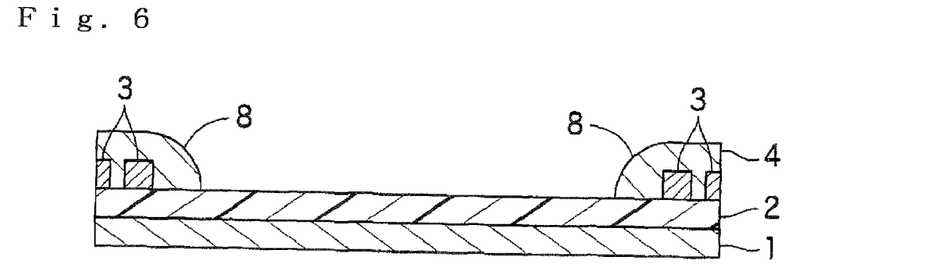
FIG. 6 is a transverse sectional view showing the construction of a touch panel optical waveguide produced by the inventive touch panel optical waveguide production method.

One example of the touch panel optical waveguide produced by this production method has a construction as shown in FIG. 6. The touch panel optical waveguide includes an under-cladding layer 2 provided on a substrate 1, cores 3 provided in a predetermined pattern on the under-cladding layer 2, and an over-cladding layer 4 in which the cores 3 are buried.

Of the two touch panel optical waveguide production methods according to the present invention, a second touch panel optical waveguide production method will be described in detail with reference to the drawings by way of an embodiment. The second touch panel optical waveguide production method includes the step of forming a coating layer by applying a photopolymerizable resin composition as an uncured over-cladding layer material dropwise on a surface portion of an under-cladding layer uncovered with the cores.

In the second touch panel optical waveguide production method, an intermediate product including an under-cladding layer 2 formed on a surface of a substrate 1 and cores 3 formed in a predetermined pattern on a surface of the under-cladding layer 2 is produced in the same manner as in the first touch panel optical waveguide production method described above, i.e., through the steps of forming the under-cladding layer 2 on the predetermined surface portion of the substrate 1, and forming the cores on the surface of the under-cladding layer 2 (see FIGS. 1 to 3).

Figure 7:
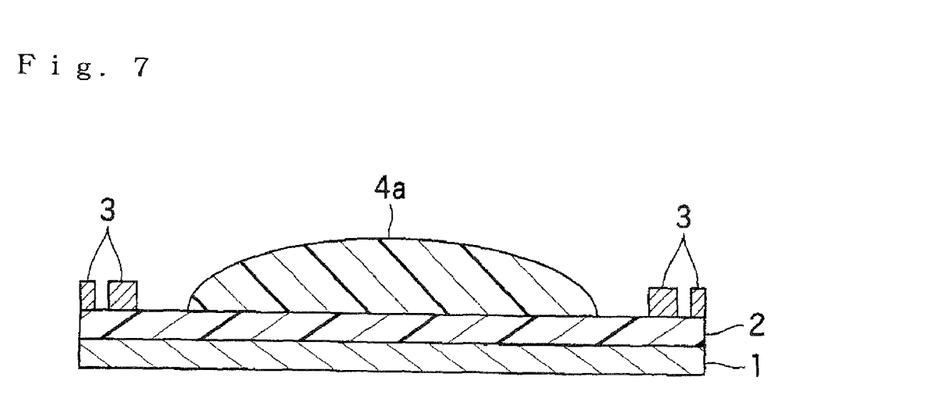
FIG. 7 is an explanatory diagram schematically showing a second touch panel optical waveguide production method according to the present invention.

In the second touch panel optical waveguide production method, an over-cladding layer 4 is formed (press-formed) by performing steps to be described later with reference to FIGS. 7 and 8 after the aforementioned steps. This is a major feature of the present invention. As shown in FIG. 7, a coating layer (resin portion) 4a is formed on the surface of the under-cladding layer 2 formed with the cores 3 of the predetermined pattern by applying a photopolymerizable resin composition as an over-cladding layer material dropwise onto a surface portion of the under-cladding layer 2 uncovered with the cores 3. The photopolymerizable resin composition as the material for the coating layer 4a is preferably in the form of liquid which can be applied dropwise. More specifically, the photopolymerizable resin composition is of a solvent-free type, and preferably has a viscosity of 500 to 3000 mPa·s at 25° C. Where the viscosity of the photopolymerizable resin composition to be used is in the aforementioned range, it is possible to substantially prevent the coating layer 4a from leaking out of a forming region during the subsequent press-forming with the use of a molding die to be described later.

Figure 8:
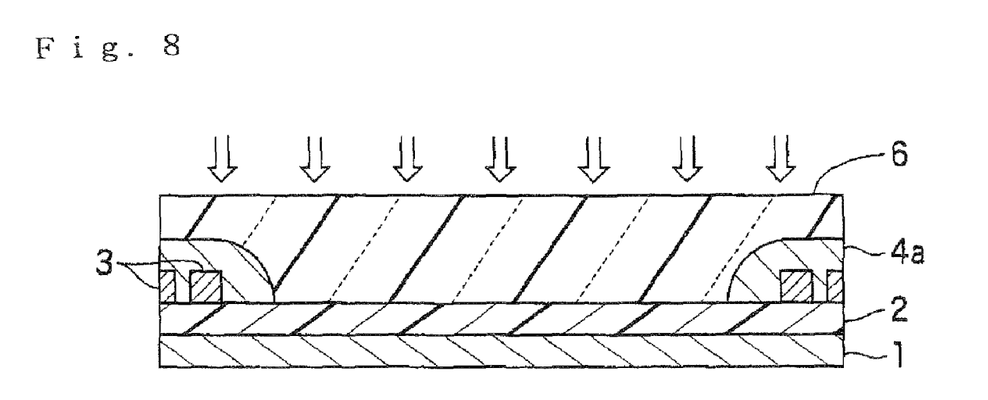
FIG. 8 is an explanatory diagram schematically showing the second touch panel optical waveguide production method according to the present invention.

In turn, as shown in FIG. 8, a molding die 6 composed of a light-transmissive material such as quartz glass is pressed against the uncured coating layer 4a formed by the dropwise application with a die surface thereof being properly positioned with respect to the coating layer 4a. In this state, the coating layer 4a is exposed to radiation through the molding die 6. The coating layer 4a is completely cured by heating after the exposure to the radiation. Thus, the over-cladding layer 4 is formed. Then, the molding die 6 is removed. The over-cladding layer 4 thus formed includes curved surfaces (lens-shaped surfaces) 8 each having a desired surface geometry as covering the distal ends of the cores 3 buried therein (see FIG. 6). The over-cladding layer 4 typically has a thickness of 50 to 2000 µm as in the aforementioned case.

In the second touch panel optical waveguide production method according to this embodiment, the die surface of the molding die 6 is configured such as to have lens-shaped surface portions in association with the distal ends of the cores 3 as in the first touch panel optical waveguide production method.

The press-forming with the use of the molding die 6 is preferably carried out at a press pressure of 0.5 to 2 MPa by an atmospheric pressure press method (e.g., at about 101.3 kPa). In the press-forming, the molding die 6 is entirely kept at 20 to 80° C.

One example of the touch panel optical waveguide produced by this production method has a construction as shown in FIG. 6. The touch panel optical waveguide includes an under-cladding layer 2 provided on a substrate 1, cores 3 provided in a predetermined pattern on the under-cladding layer 2, and an over-cladding layer 4 in which the cores 3 are buried.

In this embodiment, the portions 8 of the over-cladding layer 4 associated with the distal ends of the cores 3 each have a lens shape (a curved shape). However, the shape is not limited to the lens shape, but may be a non-lens shape such as a planar shape.

In the touch panel optical waveguide production method according to the present invention, the same material is preferably used as the under-cladding layer material and the over-cladding layer material. Examples of the material include various types of polymer materials including thermosetting resins and thermoplastic resins, among which a photopolymerizable resin composition is preferably used.

Similarly, a photopolymerizable resin composition is preferably used as the core material. The photopolymerizable resin composition to be used as the aforementioned materials is prepared, for example, by blending an epoxy compound with a photoacid generator. Further, the photopolymerizable resin composition may be blended with a diluent for properly adjusting the viscosity thereof.

The cladding layers (the under-cladding layer 2 and the over-cladding layer 4) should each have a smaller refractive index than the cores 3. More specifically, a difference in refractive index between the cores and the under-cladding layer 2 or the over-cladding layer 4 is preferably 1 to 7% at a wavelength of 830 nm. It is preferred that the under-cladding layer 2 and the over-cladding layer 4 each have a refractive index of 1.50 to 1.54 and the cores 3 each have a refractive index of 1.56 to 1.60 at a wavelength of 830 nm.

Where the touch panel optical waveguide produced in the aforementioned manner is used for a touch panel, a recessed center portion of the optical waveguide not formed with the cores is cut by laser cutting method, a stamping method using a die, or the like. Alternatively, the optical waveguide may be used as it is. The substrate 1 may be separated from the under-cladding layer 2 of the touch panel optical waveguide thus produced. Alternatively, the touch panel optical waveguide may be used as it is without the separation of the substrate 1.

The touch panel optical waveguide thus produced serves as an optical waveguide having a light outputting function or a light inputting function on the touch panel.

Next, examples of the present invention will be described. However, it should be understood that the invention be not limited to these examples.

(1) The first touch panel optical waveguide production method will be described by way of examples.

EXAMPLE 1

Preparation of Core Material

A core material was prepared by dissolving 100 parts by weight of bisphenoxyethanolfluorene diglycidyl ether, 30 parts by weight of 1,3,3-tris{4-[2-(3-oxetanyl)] butoxyphenyl}butane, 30 parts by weight of bisphenolfluorene tetraglycidyl ether, and 0.5 parts by weight of a 50% propione carbonate solution of 4,4-bis[di(β-hydroxyethoxy) phenylsulfinio]phenylsulfide bishexafluoroantimonate (a photoacid generator CP-200K available from San-Apro Ltd.) in 20 parts by weight of ethyl lactate as a diluent solvent.

Preparation of Under-Cladding Layer Material and Over-Cladding Layer Material

An under-cladding layer material and an over-cladding layer material were prepared by mixing 100 parts by weight of an epoxy resin having an alicyclic skeleton (EP-4080E available from Adeka Corporation) and 1 part by weight of a photoacid generator (photopolymerization initiator) CP-200K available from San-Apro Ltd.

Production of Touch Panel Optical Waveguide

The under-cladding layer material was first applied onto a surface of a polyethylene naphthalate film (a substrate having a size of 100 mm×100 mm×100 μm (thickness)) by a spin-coating method, and then exposed to ultraviolet radiation at 1000 mJ/cm$^2$ via a photo mask formed with an opening pattern conformable to the under-cladding layer. Subsequently, a heat treatment was performed at 80° C. for 5 minutes. Thus, the under-cladding layer was formed. The under-cladding layer had a thickness of 20 μm as measured by a contact film thickness meter. Further, the under-cladding layer had a refractive index of 1.510 (at 830 nm) after having been cured.

Then, the core material was applied onto a surface of the under-cladding layer by a spin-coating method, and dried at 100° C. for 5 minutes (the resulting dried coating layer had a thickness of 50 μm). In turn, a synthetic quartz-based photo mask formed with an opening pattern conformable to a core pattern was placed above the coating layer. Then, the coating layer was exposed to ultraviolet radiation emitted from the above at 3000 mJ/cm$^2$ by a proximity exposure method (with a gap of 50 μm), and heat-treated at 100° C. for 10 minutes. Subsequently, a development process was performed by using a γ-butyrolactone aqueous solution (by dipping the resulting product in the solution for 2 minutes) to dissolve away an unexposed portion, and the resulting product was rinsed with distilled water. Then, a heat treatment was performed at 100° C. for 5 minutes. Thus, cores were formed in a desired pattern. The cores each had a refractive index of 1.593 (at 830 nm) after having been cured.

Subsequently, the over-cladding layer material was applied to a thickness of 400 μm over the surface of the under-cladding layer formed with the cores by a spin-coating method. Then, the resulting coating layer was exposed to ultraviolet radiation at 200 mJ/cm$^2$, and then heat-treated at 80° C. for 10 minutes. Thus, the coating layer (of the over-cladding layer material) was provided in a half-cured form (B-stage). Then, a quartz molding die (having a peripheral thickness of 5 mm and a center portion thickness of 5 mm) formed with a positioning alignment mark was prepared. The molding die was pressed against the coating layer from the above with a die surface thereof (having lens-shaped surface portions in association with the distal ends of the cores) being properly positioned with respect to the coating layer. In turn, the molding die was heated to 150° C., and the coating layer was press-formed at a press pressure of 5 MPa by a vacuum-press method (1.33 Pa). Then, the coating layer was exposed to ultraviolet radiation at 1000 mJ/cm$^2$ through the molding die. Thus, the over-cladding layer (having a glass transition temperature of 85° C. after the curing) was formed as having lens-shaped portions (curved surfaces) in association with the distal ends of the cores. Thereafter, the entire molding die was cooled to 80° C., and then removed. The over-cladding layer (a portion of the over-cladding layer in which the cores were buried) had a thickness of 400 μm as measured by a contact film thickness meter.

Thus, the touch panel optical waveguide was produced which included the under-cladding layer, the cores and the over-cladding layer stacked in this order on the substrate (see FIG. 6). The over-cladding layer of the touch panel optical waveguide was free from voids.

EXAMPLE 2

Preparation of Core Material

A core material was prepared by dissolving 40 parts by weight of bisphenoxyethanolfluorene diglycidyl ether, 30 parts by weight of 1,3,3-tris{4-[2-(3-oxetanyl)]butoxyphenyl}butane, 30 parts by weight of bisphenolfluorene tetraglycidyl ether, and 0.5 parts by weight of a 50% propione carbonate solution of 4,4-bis[di(β-hydroxyethoxy)phenylsulfinio]phenylsulfide bishexafluoroantimonate (a photoacid generator CP-200K available from San-Apro Ltd.) in 30 parts by weight of ethyl lactate as a diluent solvent.

Preparation of Under-Cladding Layer Material and Over-Cladding Layer Material

An under-cladding layer material and an over-cladding layer material were prepared by dissolving 100 parts by weight of a high molecular weight epoxy resin having an alicyclic skeleton (ST-4100D available from Tohto Kasei Co., Ltd. and having a number average molecular weight (Mn) of 2395) and 1 part by weight of a photoacid generator (photopolymerization initiator) CP-200K available from San-Apro Ltd. in 80 parts by weight of cyclohexanone as a diluent solvent.

Production of Touch Panel Optical Waveguide

The under-cladding layer material was first applied onto a surface of a polyethylene naphthalate film (a substrate having a size of 100 mm×100 mm×100 μm (thickness)) by a spin-coating method, and then dried at 100° C. for 5 minutes for evaporation of the solvent (the resulting dried coating layer had a thickness of 20 μm). Subsequently, the coating layer was exposed to ultraviolet radiation at 1000 mJ/cm$^2$ via a photo mask formed with an opening pattern conformable to the under-cladding layer, and then heat-treated at 80° C. for 5 minutes. Thus, the under-cladding layer was formed. The under-cladding layer had a thickness of 20 μm as measured by a contact film thickness meter. Further, the under-cladding layer had a refractive index of 1.530 (at 830 nm) after having been cured.

Then, the core material was applied onto a surface of the under-cladding layer by a spin-coating method, and dried at 100° C. for 5 minutes (the resulting dried coating layer had a thickness of 50 μm). In turn, a synthetic quartz-based photo mask formed with an opening pattern conformable to a core pattern was placed above the coating layer. Then, the coating layer was exposed to ultraviolet radiation emitted from the above at 3000 mJ/cm$^2$ by a proximity exposure method (with a gap of 50 μm), and heat-treated at 100° C. for 10 minutes. Subsequently, a development process was performed by using a γ-butyrolactone aqueous solution (by dipping the resulting product in the solution for 2 minutes) to dissolve away an unexposed portion, and the resulting product was rinsed with distilled water. Then, a heat treatment was performed at 100° C. for 5 minutes. Thus, cores were formed in a desired pattern. The cores each had a refractive index of 1.593 (at 830 nm) after having been cured.

Subsequently, the (uncured) over-cladding layer material was applied to a thickness of 400 μm over the surface of the under-cladding layer formed with the cores by a spin-coating method, and then dried at 100° C. for 5 minutes for evaporation of the solvent so that the coating layer was provided in a film form. In turn, a quartz molding die (having a peripheral thickness of 5 mm and a center portion thickness of 5 mm) formed with a positioning alignment mark was prepared. Then, the molding die was pressed against the coating film layer from the above with a die surface thereof (having lens-shaped surface portions in association with the distal ends of the cores) being properly positioned with respect to the coating layer. In turn, the molding die was heated to 120° C., and the coating layer was press-formed at a press pressure of 5 MPa by a vacuum-press method (1.33 Pa). Then, the coating layer was exposed to ultraviolet radiation at 1000 mJ/cm$^2$ through the molding die. Thus, the over-cladding layer (having a glass transition temperature of 50° C. after the curing) was formed as having lens-shaped portions (curved surfaces) in association with the distal ends of the cores. Thereafter, the entire molding die was cooled to 80° C., and then removed. The over-cladding layer (a portion of the over-cladding layer in which the cores were buried) had a thickness of 400 μm as measured by a contact film thickness meter.

Thus, the touch panel optical waveguide was produced which included the under-cladding layer, the cores and the over-cladding layer stacked in this order on the substrate (see FIG. 6). The over-cladding layer of the touch panel optical waveguide was free from voids.

(2) The second touch panel optical waveguide production method will be described by way of an example.

EXAMPLE 3

Preparation of Core Material

A core material was prepared by dissolving 40 parts by weight of bisphenoxyethanolfluorene diglycidyl ether, 30 parts by weight of 1,3,3-tris{4-[2-(3-oxetanyl)]butoxyphenyl}butane, 30 parts by weight of bisphenolfluorene tetraglycidyl ether, and 0.5 parts by weight of a 50% propione carbonate solution of 4,4-bis[di(β-hydroxyethoxy)phenylsulfinio]phenylsulfide bishexafluoroantimonate (a photoacid generator CP-200K available from San-Apro Ltd.) in 20 parts by weight of ethyl lactate as a diluent solvent.

Preparation of Under-Cladding Layer Material and Over-Cladding Layer Material

An under-cladding layer material and an over-cladding layer material were prepared by mixing 100 parts by weight of an epoxy resin having an alicyclic skeleton (EP-4080E available from Adeka Corporation) and 1 part by weight of a photoacid generator (photopolymerization initiator) CP-200K available from San-Apro Ltd.

Production of Touch Panel Optical Waveguide

The under-cladding layer material was first applied to a thickness of 20 μm onto a surface of a polyethylene naphthalate film (a substrate having a size of 100 mm×100 mm×100 μm (thickness)) by a spin-coating method, and then exposed to ultraviolet radiation at 1000 mJ/cm$^2$ via a photo mask formed with an opening pattern conformable to the under-cladding layer. Subsequently, a heat treatment was performed at 80° C. for 5 minutes. Thus, the under-cladding layer was formed. The under-cladding layer had a thickness of 20 μm as measured by a contact film thickness meter. Further, the under-cladding layer had a refractive index of 1.510 (at 830 nm) after having been cured.

Then, the core material was applied onto a surface of the under-cladding layer by a spin-coating method, and dried at 100° C. for 5 minutes (the resulting dried coating layer had a thickness of 50 μm). In turn, a synthetic quartz-based photo mask formed with an opening pattern conformable to a core pattern was placed above the coating layer. Then, the coating layer was exposed to ultraviolet radiation emitted from the above at 3000 mJ/cm$^2$ by a proximity exposure method (with a gap of 50 μm), and heat-treated at 100° C. for 10 minutes. Subsequently, a development process was performed by using a γ-butyrolactone aqueous solution (by dipping the resulting product in the solution for 2 minutes) to dissolve away an unexposed portion, and the resulting product was rinsed with distilled water. Then, a heat treatment was performed at 100° C. for 5 minutes. Thus, cores were formed in a desired pattern. The cores each had a refractive index of 1.593 (at 830 nm) after having been cured.

Subsequently, 10 ml of the liquid (uncured) over-cladding layer material was applied dropwise on a portion of the surface of the under-cladding layer uncovered with the cores. Then, a quartz molding die (having a peripheral thickness of 5 mm and a center portion thickness of 5 mm) formed with a positioning alignment mark was prepared. The molding die was pressed against the over-cladding layer material thus applied dropwise with a die surface thereof (having lens-shaped surface portions in association with the distal ends of the cores) being properly positioned with respect to the applied over-cladding layer material. In turn, the molding die was heated to 40° C., and the over-cladding layer material was press-formed at a press pressure of 0.5 MPa by a vacuum-press method (1.33 Pa). Then, the over-cladding layer material was exposed to ultraviolet radiation at 1000 mJ/cm$^2$ through the molding die. Thus, the over-cladding layer (having a glass transition temperature of 70° C. after the curing) was formed as having lens-shaped portions (curved surfaces) in association with the distal ends of the cores. Thereafter, the molding die was removed. The over-cladding layer (a portion of the over-cladding layer in which the cores were buried) had a thickness of 50 μm as measured by a contact film thickness meter.

Thus, the touch panel optical waveguide was produced which included the under-cladding layer, the cores and the over-cladding layer stacked in this order on the substrate (see FIG. 6). The over-cladding layer of the touch panel optical waveguide was free from voids.

INDUSTRIAL APPLICABILITY

The optical waveguides produced by the touch panel optical waveguide production methods according to the present invention are used for the touch panel.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A touch panel optical waveguide production method comprising the steps of:
    forming an under-cladding layer on a surface of a substrate;
    forming a core of a predetermined pattern on the under-cladding layer;
    forming a coating layer of an uncured photopolymerizable resin composition to form an over-cladding layer material over a surface of the under-cladding layer formed with the core by
    preparing an uncured photopolymerizable resin composition from an epoxy resin having a number average molecular weight (Mn) of about 1000 to about 5000,
    adjusting the viscosity of the uncured photopolymerizable resin composition to a viscosity of 300 to 2000 mPa·s by addition of a solvent,
    coating a portion of the surface of the under-cladding layer uncovered with the core with the viscosity adjusted uncured photopolymerizable resin composition as the over-cladding layer material in the coating layer forming step, and
    evaporating the solvent by heat-drying to form the coating layer,
    wherein the coating layer has a thickness of 100 to 500 μm;
    pressing a molding die composed of a light-transmissive material against the coating layer of the over-cladding layer material with a predetermined die surface of the molding die being properly positioned with respect to the coating layer, the die surface having a lens-shaped curved portion;
    exposing the coating layer to light through the molding die; and
    removing the molding die after the exposure, whereby an over-cladding layer without a void is formed in which the core is buried, the over-cladding layer including a curved surface which is curved towards the inner side of the substrate formed on a portion covering a distal end of the core buried therein and the over-cladding layer has a thickness of 50 to 2000 μm.

2. The touch panel optical waveguide production method as set forth in claim 1,
    wherein the coating layer is formed so that the core is buried in the coating layer in the coating layer forming step,
    wherein the molding die is entirely heated to 120 to 180° C. for heat press in the pressing step.

3. The touch panel optical waveguide production method as set forth in claim 2, wherein the pressing is carried out at a press pressure of 2 to 10 MPa and by a vacuum press method.

* * * * *